United States Patent
Kumar et al.

(10) Patent No.: US 6,846,666 B2
(45) Date of Patent: Jan. 25, 2005

(54) BACTERIAL STRAIN MTCC 5098 AND A METHOD OF REDUCING TOTAL DISSOLVED SOLIDS (TDS) FROM PULP AND PAPER WASTEWATER EFFLUENTS USING THE SAID STRAIN

(75) Inventors: Rita Kumar, New Delhi (IN); Deepa Kachroo Tiku, New Delhi (IN); Poonam Sharma, New Delhi (IN)

(73) Assignee: Council of Scientific and Industrial Research, New Delhi (IN)

( * ) Notice: Subject to any disclaimer, the term of this patent is extended or adjusted under 35 U.S.C. 154(b) by 59 days.

(21) Appl. No.: 10/393,380

(22) Filed: Mar. 21, 2003

(65) Prior Publication Data

US 2004/0016523 A1 Jan. 29, 2004

Related U.S. Application Data

(60) Provisional application No. 60/365,839, filed on Mar. 21, 2002.

(51) Int. Cl.$^7$ ................................................ C12N 1/00
(52) U.S. Cl. ...................................... 435/243; 435/262.5
(58) Field of Search ............................... 435/243, 262.5

(56) References Cited

U.S. PATENT DOCUMENTS 6,100,081 A * 8/2000 Buelna ....................... 435/266

* cited by examiner

*Primary Examiner*—Chester T. Barry
(74) *Attorney, Agent, or Firm*—Foley & Lardner LLP

(57) ABSTRACT

The present invention relates to a bacterial strain of accession number MTCC 5098 useful for reducing the Total dissolved solids (TDS) levels from pulp and paper waste water effluents, and a process for the preparation of innoculum of the strain and also, a method of reducing Total dissolved solids (TDS) from pulp and paper waste water effluents using the said strain.

10 Claims, No Drawings

BACTERIAL STRAIN MTCC 5098 AND A METHOD OF REDUCING TOTAL DISSOLVED SOLIDS (TDS) FROM PULP AND PAPER WASTEWATER EFFLUENTS USING THE SAID STRAIN

This application claim benefit of 60/365,839 filed on March 21, 2002.

FIELD OF THE PRESENT INVENTION

The present invention relates to a bacterial strain B11 of accession number MTCC 5098 useful for reducing the Total dissolved solids (TDS) levels from pulp and paper waste water effluents, and a process for the preparation of inoculum of the strain and also, a method of reducing Total dissolved solids (TDS) from pulp and paper waste water effluents using the said strain.

BACKGROUND AND PRIOR ART OF THE PRESENT INVENTION

The pulp and paper industry is a highly water-intensive industry consuming enormous amount of water per ton of paper produced. The worrying factor is that it discharges approximately 70% of the water consumed during processing. However, this water discharge is no longer the clean water that was used for processing. Instead, it contains high amounts of organic as well as inorganic compounds, which emanate from the raw materials as well as the chemicals used during processing and production of paper. Due to the above, there is a sharp increase in the overall pollutional load of the wastewaters and subsequently, the receiving waters. It is for these reasons, the pulp mill industrial wastewaters have attracted the attention of environmentalist and people, globally.

Biochemical Oxygen Demand (BOD) and Chemical Oxygen Demand (COD) are indices of the biologically degradable and chemically oxidizable fractions of the wastewater, respectively. These are monitored regularly to give clearance to the discharge of the above wastewaters. Total Dissolved Solids (TDS) is a parameter, which gives us the index of dissolved compounds, both organic as well as inorganic, present in the said wastewaters (APHA, $20^{th}$ ed.). It is this dissolved strength of chemicals, which imparts a toxic load to the effluents and hence, the overall pollutional load. However, this parameter has long been ignored because of lack of suitable technologies available for the same.

Total Dissolved Solids need to be monitored regularly in wastewaters since such load changes the quality and composition of the receiving waters as well, which could be deleterious in many ways, besides creating aesthetic problems. Dissolved solids have a direct impact on various parameters like hardness, heavy metal content and carcinogenicity of the receiving waters leading to imbalances in aquatic biota and reduced water quality for domestic use.

A recently conducted survey on the Nam Phong river in Thailand indicated that it was much affected by the contaminated waters which flowed from the nearby Phoenix Pulp and Paper company and reportedly killed many fish. Evaluation of these waters revealed that besides the BOD and COD load, the TDS content was very high (Immuong, 1998). Hence, even though this parameter may not seem important as far as the implementing agencies are concerned, yet the implications of its high loading are manifold.

Pulp and paper mills employ various raw materials and chemicals for processing and production. As a result, the above chemicals, in their varied forms, are present in the discharges emanated from these mills and contribute to the dissolved solids content. The organic dissolved compounds consist mainly of chlorinated compounds, which arise in the form of chlorinated lignin derivatives, chlorinated phenolics and chlorinated resin acids like abietic and pimaric acids, etc. Organically bound halogens (or halide-OX) where the halogen is usually chlorine, imparts, what is called AOX (Adsorbable Organic halide) in the effluent (berry, 1992). Besides the above chlorinated compounds, unsaturated fatty acids and degraded oxidation products of celluloses and carbohydrates are also responsible for the increase in the TDS load.

Among the inorganic dissolved components, free chlorine, sulphates, sulphides, carbonates, bicarbonates, predominate as the major anions; and calcium, magnesium, aluminium, iron and other heavy metal ions as the prevalent cations. Both inorganic and organic dissolved solids raise the TDS (mg/l) to a very high level. In India, the Bureau of Indian standards (BIS) have set up an upper limit of 2100 mg/l TDS for discharges into rivers and streams. However, if evaluated properly, the pulp and paper effluents do not conform to the above standards, not withstanding the fact that a TDS level above 1200 mg/l is considered to be toxic to the aquatic system (USEPA). However, since the available and currently used TDS reducing technologies are not able to practically reduce the TDS to a great extent, the governmental agencies have not lowered the upper limit.

Currently available TDS reducing technologies are strictly physico-chemical in nature. The major technologies being Reverse Osmosis (RO), Electrodialysis Reversal (EDR) and Ion Exchange.

RO

It is a physical process in which contaminants are removed by applying pressure on the feed water to direct it through a semi-permeable membrane. This process requires a careful review of raw water characteristics and pretreatment to prevent membranes from fouling, scaling or other membrane degradation. This technology is relatively expensive to install and operate, requires frequent membrane monitoring and maintenance as also stringent pressure, temperature and pH requirements to meet membrane tolerance

EDR

It is an electrochemical process in which ions migrate through ion-selective semi-permeable membranes as a result of their attraction to two electrically charged membrane surface. EDR uses the technique of regularly reversing the polarity of the electrodes, thereby freeing accumulated ions on the membrane surface. However EDR is not suitable for high levels of Fe and Mn, H2S, chlorine or hardness. Also, the process is limited to water with 3000 mg/l TDS or less.

Ion Exchange

Based on the ionic charges of the components, ion-exchange resins trap the dissolved constituents and reduce the TDS. However, the problems of reusability of these ion-exchange columns increase the economic burden.

All the above physico-chemical techniques have the major disadvantages of economics, reusability and treatability range. Disposal problems are also there since these methods do not eliminate TDS completely and accumulate such solids elsewhere, in some other form.

Pulp mill effluents are markedly different in their nature and composition and hence the dissolved solids present therein are also different from those present in other effluents. Though biological treatment methods are always advantageous over the physico-chemical ones, TDS in pulp mill effluents is not effectively reduced by the conventional biological treatment. The overall pollution load, too, cannot be taken care of, by the above treatment, since, these effluents are typically deficient in nitrogen and phosphorus. Therefore, it becomes imperative for ETP operators to add supplementary nutrients, such as urea and phosphoric acid during treatment of such effluents. An overdosing of such nutrients is always done to some degree to ensure sufficient nitrogen demand under all conditions. As a result, treated wastewater, usually contain excess amounts of both nutrients, contributing to the overall dissolved solids contents and potential impacts on the receiving waters such as eutrophication (DMEHIA, 1999).

It is because of all the above reasons, the inventors felt the need for developing a biological treatment technique which would reduce the TDS levels in an inexpensive and environment-friendly manner. It was felt that bacteria isolated from natural environment, would be capable of reducing the level of TDS in wastewaters. Initially, consortia of bacteria were studied but later it was observed that a single bacterium is also equally capable of the same.

OBJECTS OF THE PRESENT INVENTION

The main object of the present invention is to isolate a novel bacterial strain.

Another main object of the present invention is to isolate a novel strain capable of reducing the levels of TDS in paper and pulp wastewater effluents.

Yet another main object of the present invention is to provide a novel biological process for the aerobic treatment of pulp mill wastewater in terms of reduction in TDS levels.

Still another object of the present invention is to develop a method of reducing Total dissolved solids (TDS) from pulp and paper waste water effluents using the strain of claim 1.

Still another object of the present invention is to develop a process for the preparation of inoculum of the novel bacterial strain.

Still another object of the invention is to provide an aerobic, bacterial isolate capable of reducing TDS from pulp mill wastewaters.

SUMMARY OF THE PRESENT INVENTION

The present invention relates to a bacterial strain of accession number MTCC 5098 useful for reducing the Total dissolved solids (TDS) levels from pulp and paper waste water effluents, and a process for the preparation of inoculum of the strain and also, a method of reducing Total dissolved solids (TDS) from pulp and paper waste water effluents using the said strain.

DETAILED DESCRIPTION OF THE PRESENT INVENTION

Accordingly, the present invention relates to a bacterial strain of accession number MTCC 5098 useful for reducing the Total dissolved solids (TDS) levels from pulp and paper waste water effluents, and a process for the preparation of inoculum of the strain and also, a method of reducing Total dissolved solids (TDS) from pulp and paper waste water effluents using the said strain.

In an embodiment of the present invention, a bacterial strain of accession number MTCC 5098 useful for reducing the Total dissolved solids (TDS) levels from pulp and paper waste water effluents.

In yet another embodiment of the present invention, a method of reducing Total dissolved solids (TDS) from pulp and paper wastewater effluents using the strain of claim 1, said method comprises steps of:
  inoculating the effluent with the strain to obtain cell slurry,
  incubating the cell slurry at about 37° C. at 100 rpm,
  estimating TDS levels using the modified TDS method, In still another embodiment of the present invention, wherein said method exhibits a TDS reduction of range 4.0 to 12.2 in about 48 hours.

In still another embodiment of the present invention, a wherein the ratio of effluent to biomass is ranging between 1:20 to 1:1.

In still another embodiment of the present invention, wherein said method exhibits a TDS reduction of about 10.1% in about 24 hours.

In still another embodiment of the present invention, wherein said method with effluent biomass ratio of about 1:1 exhibits a TDS reduction of about 12.2% in about 48 hours.

In still another embodiment of the present invention, wherein the ratio of effluent to biomass is 1:1.

In another embodiment of the present invention, wherein a process for the preparation of inoculum of the strain of claim 1, said process comprising steps of:
  isolating a bacterial isolate,
  culturing the bacterial isolate on medium containing soil extract prepared from soil sample and lignin of concentration about 0.3% to get pure cultures,
  inoculating the pure culture in nutrient broth containing Tween 80 of concentration about 0.01% to obtain starter culture,
  inoculating starter culture into aliquot of nutrient broth to obtain medium,
  incubating the medium at about 37° C. for about 100 rpm for time duration ranging between 16–18 hours to obtain a culture of optical density of 1.0,
  centrifuging the culture of step (e) after attaining an to obtain pellet,
  washing the pellet twice by dissolving in $PO_4^{-3}$ buffer of concentration about 0.05M of pH 6.8,
  recentrifuging the washed-pellet at temperature of about 40° C. to obtain pellets,
  washing recentrifuged pellets of step (h) by dissolving in minimum volume of effluent,
  recentrifuging washed pellets of step (i) to obtain cell pellets, and
  homogenizing the cell pellet in minimum volume of effluents to obtain cell slurry for TDS reduction.

In still another embodiment of the present invention, wherein nutrient broth comprising 5.0 g of sodium chloride, 1.5 g of betel extract, 1.5 g of yeast extract, and 0.2 ml of tween-80.

In still another embodiment of the present invention, wherein centrifuging at about 6000 rpm for time duration of about 20 minutes at 4° C.

The strain of the instant Application is been deposited in an International depository Microbial Type Culture Collection (MTCC) at Chandigarh, INDIA. It is been allocated the Accession No. of MTCC 5098. Recently, it is been granted the status of an International Depository under the Budapest Treaty.

As described in the provisional patent, in the preliminary experiments bacterial consortium was found to reduce Total Dissolved Solids (TDS) levels of the pulp mill wastewaters by approximately 20–25%, over a period of five days.

However, later studies were performed to reduce the retention time of the same. This resulted in approximately 12% reduction in the TDS levels of the pulp mill effluent within a period of 48 hours by a single bacterial isolate, which is definitely better than the earlier 5-day retention period. The single isolate gave the reduction of TDS, though quantitatively less, but in short period of 48 hrs (two days). Since shorter effluent retention period is recommended in the industry therefore, in the complete patent specification, the results obtained by using the individual bacterial isolate have been presented; being markedly better than those obtained by the bacterial consortia.

In still another embodiment of the present invention, wherein the present invention provides a novel aerobic process for the reduction in the levels of TDS in pulp mill wastewaters using a modified method for the analysis of TDS. Also disclosed is an aerobic bacterial isolate, capable of significantly reducing the TDS load of pulp mill effluents.

In still another embodiment of the present invention, wherein present invention relates to a novel, aerobic biological process for the reduction of Total Dissolved Solids (TDS) from pulp mill wastewaters using a bacterial isolate and a modified method for the analysis of TDS.

In still another embodiment of the present invention, wherein The invention provides a novel aerobic biological process for the reduction of Total Dissolved Solids (TDS) from pulp mill wastewaters. Also is disclosed the bacterial strain isolated from a specific site (soil). The disclosed isolate significantly reduces the levels of Total Dissolved Solids (TDS) from pulp mill wastewaters.

In still another embodiment of the present invention, wherein The bacterial isolate according to the present invention is presently deposited at IGIB as CBTCC/ and its identification is underway.

In still another embodiment of the present invention, wherein The bacterial isolate in the present invention is useful for reducing TDS levels in pulp mill wastewater.

In still another embodiment of the present invention, wherein The bacterial isolate in the present invention has been isolated from a ten year old site where saw dust continually accumulated over the period.

In still another embodiment of the present invention, wherein 5 gm of fresh soil from the above said site is inoculated in the enrichment medium. Enrichment medium is prepared by adding 75 ml of soil extract to 150 ml of Nutrient Broth. To this, 5 ml each of 0.1% stock solutions of lignin and cellulose are added along with 100 $\mu$l of Candid B, autoclaved at 15 lbs for 20 minutes at 121° C. The above medium is kept at 120 rpm for 48 hours at 30° C.

In still another embodiment of the present invention, wherein Soil Extract is prepared from the soil collected from the above site. 1 kg of the soil is dried at 50° C. for 2 hrs. 400 gm of the dried soil is autoclaved with 960 ml single distilled water for 1 hr at 15 lbs. After autoclaving, the sample is centrifuged at 5000 rpm for 10 minutes at 5° C. The supernatant (extract) is collected and stored in sterile containers for preparation of medium for isolation.

In still another embodiment of the present invention, wherein The enriched soil samples are serially diluted in $Na_2HPO_4$—$NaH_2PO_4$ buffer (pH 6.8, 0.05 M). 100 $\mu$l from each respective dilution is spread plated in duplicates on media plates containing soil extract, 0.3% lignin, 100 $\mu$l of Candid B and 2% agar. The plates thus obtained are incubated at 30±2° C. for 16–24 hrs in an inverted position.

In still another embodiment of the present invention, wherein The single isolated colony is picked and streaked on a fresh plate containing the same medium. The above step is repeated till pure colonies are obtained.

In still another embodiment of the present invention, wherein The above mentioned bacterium is inoculated with the help of sterile, nichrome loop into 15–20 ml sterile nutrient broth (NB) containing (per liter), 5.0 g peptic digest of animal tissue, 5.0 g of sodium chloride, 1.5 g of beef extract, 1.5 g of yeast extract and 0.2 ml Tween-80. The culture is incubated at 37° C. for approximately 16–18 hours in an incubator shaker. For gentle shaking, the incubator shaker is maintained at an appropriate rpm, preferably 100 rpm. After sufficient growth is obtained, the broth is stored at 4° C. till further use. 250 $\mu$l of sterile NB is inoculated with 250 $\mu$l of the above prepared starter culture. The flask is kept for incubation at 37° C./100 rpm for 16–18 hours till an optical density (650 nm) Of 1.0 is achieved. The cells are harvested by centrifuging at an appropriate rpm, preferably 6000 rpm for 20 minutes.

The resultant pellet is washed twice by dissolving in minimum quantity of phosphate buffer, 0.05 M, pH 6.8 and recentrifuged under the same rpm and time conditions. During centrifugation, the temperature is maintained at 4° C. The pellet thus obtained, is washed in minimum volume of respective effluent and recentrifuged to minimise any chances of the buffer salts entering into the sample thus reducing the chance of any increase in Total dissolved salts by them. The pellets thus obtained are then resuspended in minimum volume of respective effluent, vortexed to make a homogeneous suspension and used for reducing TDS from the pulp mill effluent.

In still another embodiment of the present invention, wherein Effluent from pulp and paper mill is treated for TDS reduction in the present invention. For setting up the TDS reduction experiments, 250 ml of sample is taken in screw-capped conical shake-flasks. The inoculum is added to the effluent samples after checking the pH of the effluents to be preferably around 7.0. Control flask, without any added inocula are also maintained for comparison. The flasks are incubated at 37° C./100 rpm for a period of 24 hours.

In still another embodiment of the present invention, wherein For assessing the reduction in the TDS levels, approximately 70 ml is withdrawn and processed for analysis. The samples withdrawn are centrifuged in dry and clean centrifuge tubes (rinsed with triple distilled water) at 7000 rpm for 20 minutes, preferably at 4° C. The supernatant is collected immediately in clean and dry containers prerinsed with triple distilled water. The supernatant is then filtered through 0.45$\mu$ membrane filters (Millipore). 25 ml of this is then measured with the help of a clean and pre-rinsed measuring cylinder and transferred to a cleaned, overnight-dried, desiccated and pre-weighed beaker. The measuring cylinder is rinsed again with 20 ml of triple distilled water and the same transferred to the beaker containing the sample. The same procedure is repeated for processing all the samples. The beakers are then dried in a hot air oven at 180±2° C. After drying, the beakers are transferred to a vacuum desiccator and cooled for approximately 45 minutes to one hour to attain room temperature and weighed.

TDS (mg/l) is calculated using the following formula:

TDS(mg/l)=$(A-B)$/sample volume

Where,

A=final weight of the beaker with dried filtrate

B=initial weight of the beaker without sample

In still another embodiment of the present invention, wherein The invention further provides a process for the preparation of inoculum of the said bacterial isolate and using it for reduction of Total Dissolved Solids (TDS) from pulp mill effluents, which comprises:

a) isolating a bacterial isolate from the soil obtained from a saw-dust accumulating site.

b) culturing the said bacterial isolate on soil extract prepared from the collected soil, to which 0.3% lignin and nutrient agar was added, to obtain pure cultures;

c) inoculating the pure culture of the said bacterial isolate in nutrient broth containing 0.01% Tween 80 to obtain starter culture;

d) culturing the above bacterial isolate for obtaining required biomass by inoculating 250 ml of nutrient broth, with the starter culture and incubating the above at 37° C./100 rpm for 16–18 hours;

e) centrifuging the resulting culture, after attaining an optical density of 1.0, to obtain pellet, washing the collected pellet by dissolving in $PO_4^{-3}$ buffer, 0.05M, pH 6.8, re-centrifuging the pellet;

f) collecting the pellet obtained from step (e), washing by dissolving in 10 ml of respective effluents and re-centrifuging to obtain cell pellet for treatability studies;

g) Dissolving the above formed pellet in minimum volume of respective effluents and homogenising by vortexing to obtain cell slurry;

h) inoculating 250 ml of the pulp mill effluents with the cell slurry obtained in step (g) for TDS reduction studies along with control flask containing effluent samples without any added inoculum;

i) incubating the flasks set up in step (h) at 37° C./100 rpm for 24 hours;

j) Withdrawing samples from the above flasks in 70 ml aliquots and processing them for assessing TDS levels;

k) Analysing TDS of the above samples using the modified method;

l) Centrifuging the above samples at 8000 rpm, for 20 minutes and filtering the supernatant through $0.45\mu$ membrane filters (Millipore) and then using this filtrate for estimation of dry weight.

m) Analysing the TDS removal efficiency of the above said bacterial isolate by comparing with the TDS levels of control samples after 24 hours.

In still another embodiment of the present invention, wherein the bacterial isolate is isolated from the soil collected from an old saw-dust collection site using defined medium.

In still another embodiment of the present invention, wherein the above mentioned bacterial isolate is inoculated in nutrient broth containing 0.01% Tween 80 to obtain the starter culture.

In another embodiment of the present invention, the culture of the bacterial isolate is prepared by inoculating 250 ml of nutrient broth with starter culture.

In another embodiment of the present invention, the incubation of the bacterial strains is carried out by gentle agitation at 100 rpm.

In an embodiment of the present invention, the growth of the incubated bacterial strains is carried out at a temperature of 37° C. for a period of 16–18 hours.

In another embodiment of the present invention, the said bacterial isolate was centrifuged at appropriate rpm preferably 6000 rpm for a period of approximately 20 minutes at 4° C., after achieving an optical density of approximately 1.0.

In a further embodiment of the present invention, the resulting pellet is washed by dissolving in minimum quantity of phosphate buffer, 0.05 M, pH 6.8 and recentrifuged using the same rpm and time conditions. During centrifugation, the temperature is maintained at 4° C.

In a further embodiment of the present invention, the pellet thus obtained, is washed by dissolving in 10.0 ml of effluent and centrifuging under the conditions as stated earlier.

In an embodiment of the present invention, the resulting pellet is resuspended in minimum volume of effluent and vortexed to make a homogeneous suspension In one of the embodiment of the present invention, the cell slurry obtained above is used for inoculating the effluent samples for reducing TDS.

The invention further provides a method for the reduction of TDS levels from pulp mill effluent samples.

In another embodiment of the present invention, the flasks containing the above inoculum are incubated at 37° C. at 120 rpm for 24 hours.

In another embodiment of the present invention, TDS of the above samples is analysed using modified APHA method.

In a further embodiment of the present invention, the above samples are centrifuged at 8000 rpm for 20 minutes.

In another embodiment of the present invention, the supernatant is filtered through $0.45\mu$ membrane filters (Millipore) and then used for estimation of dry weight.

In a further embodiment of the present invention, the reduction in Total Dissolved Solids levels is observed over a period of 24 hours.

The examples shown below are merely to explain the functioning of the invention of the instant Application and should not be construed to limit the scope of the invention.

EXAMPLE 1

Bacteria were isolated from wastewater emerging from both inlet as well as outlet of Effluent Treatment Plant. The pH of the effluent was checked and found to be 7.6±0.2. Filtered and autoclaved wastewater was used as media for isolating autochthonous bacteria in different percentages viz., 100%, 80%, 50%, 30% and 10% using mineral salts medium (MSM). The composition of the MSM used was as follows:

| | |
|---|---|
| $K_2HPO_4$ | 5 mM |
| $KH_2PO_4$ | 5 mM |
| $MgSO_4.7H_2O$ | 1 mM |
| EDTA | 0.3 mM |
| $ZnSO_4.7H_2O$ | 0.01 mM |
| $MnSO_4.7H_2O$ | 0.02 mM |
| $CuSO_4.7H_2O$ | 0.004 mM |
| $FeSO_4.7H_2O$ | 0.1 mM |
| $NaMoO_4.2H_2O$ | 0.004 mM |
| $(NH_4)_2SO_4.7H_2O$ | 5 mM |
| pH | 7.0 ± 0.2 |

To 100 ml aliquots of Nutrient Broth (NB), 1 ml each inlet as well as outlet of wastewater was added and kept at 37° C./24–48 hrs for enrichment.

Effluent-MSM plates were prepared using 2% agar as solidifying agent. The plates were kept for solidification and inverted till further use. Serial dilution plating was carried out by serially diluting the enriched inocula till a dilution of $10^{-12}$. Serial dilution was carried out by taking 9 ml aliquots of Na2HPO4—NaH2PO4 buffer (pH 6.8, 0.05 M) and inoculating 1 ml of enriched inoculum in the first vial, vortexing and taking 1 ml from this vial and diluting the next vial with it, till a $10^{-12}$ dilution was obtained, These vials were then used for plating on to the effluent MSM plates.

All plates were prepared in duplicates and incubated for 24–48 hours at 37° C. Colonies appearing on these plates were marked according to morphological differences and selected for further purification.

Colonies exhibiting different morphological appearance were picked with sterile inoculating needle and streaked on plates containing the respective growth media. After two to three repetitive subculturing, purified isolates were obtained which were tested for purity and stored as slants and stabs in their respective media.

Loopful of cultures were taken and inoculated in sterile nutrient broth, vortexed and kept for incubation at 37° C./120 rpm for 16–18 hrs. Checked the optical density of these mother cultures at 650 nm.

Morphologically different bacteria were selected and from the prepared mother cultures, working cultures were prepared for screening their ability to reduce colour from pulp mill wastewater. 100 ml sterile NB was inoculated with 100 µl of respective mother cultures and incubated at 37° C./120 rpm for 16–18 hours. The initial and final optical densities at 650 nm were noted. Cultures were harvested at an $OD_{650}$ of 1.0 by centrifuging at 6000 rpm for 20 minutes at 4° C. The pellet obtained was washed twice using sterile phosphate buffer (pH 6.8 0.05 M) and resuspended in small volume of the same. This suspension was then used for treatability assay in a ratio of 1:1, i.e., 100 ml of effluent sample was treated with pellet obtained from 100 ml of culture media.

The TDS reduction experiments were carried out in batch cultures in conical shake flasks at 37° C. at 120 rpm for a period of five days. Control flasks without any additional inoculum were also maintained and results compared with these samples. TDS was analysed over a period of five days according to the standard procedure as mentioned in APHA. An increase in the TDS levels were observed on addition of biomass, which could be due to the passage of bacteria passing through GFC filter (pore size 1.2µ), thus contributing to the weight of the residue obtained (Table 1). Hence in all the future experiments a modified TDS analysis method was employed.

TABLE 1

Percentage reduction in TDS by mixed bacterial consortia

| CONSORTIA | $5^{TH}$ DAY |
|---|---|
| C1 | 0.10 |
| C2 | −0.20 |
| C3 | −0.40 |
| C4 | −0.02 |
| C5 | −1.30 |
| C6 | 2.6 |
| C7 | −3.2 |
| C8 | 0.05 |
| C9 | 0.35 |

EXAMPLE 2

The same bacterial consortia, in addition to seven more, were used for checking their efficiency in TDS reduction of pulp mill effluent by modifying the TDS analysis method. The individual bacteria comprising the consortia were grown in appropriate aliquots of NB till an $O.D._{650}$ of 1.0. The preparation of the bacterial consortia was conducted in the same manner as described in example I. 100 ml aliquots were treated in a 1:1 ratio with the prepared consortia. Analysis of TDS levels over a period of five-days was carried out by using a modified method.

The samples were withdrawn in appropriate aliquots and centrifuged at 7000 rpm for a period of 20 minutes. The supernatant was then passed through a 0.45µ (Millipore) filter. The filtrate was then measured through a clean, prerinsed measuring cylinder and transferred to a clean, preweighed beaker. The beaker had been rinsed with triple distilled water, baked overnight at 180° C., desiccated at preweighed before transferring the sample. The beakers containing the sample were then placed at 180° C. in a hot air oven for overnight drying. The beakers were then desiccated to cool to room temperature and weighed to calculate the weight of the residue. The same was then calculated to find the actual TDS value, expressed in mg/l (Table 2).

A TDS reduction of up to 12% was observed in the pulp mill effluent by one of the consortia, after 5 days.

TABLE 2

Percentage reduction in TDS of pulp mill effluent samples by mixed bacterial consortia

| | PERCENTAGE REDUCTION IN TDS | |
|---|---|---|
| CONSORTIA | $3^{RD}$ DAY | $5^{TH}$ DAY |
| C1 | 5.2 | 10.2 |
| C2 | 4.4 | 12.7 |
| C3 | 4.1 | 11.2 |
| C4 | 6.4 | 10.6 |
| C5 | 6.8 | 9.6 |
| C6 | 10.2 | 9.6 |
| C7 | 5.6 | 10.3 |
| C8 | 9.5 | 8.3 |
| C9 | 7.2 | 7.8 |
| C10 | 5.2 | 10.0 |
| C11 | 3.8 | 9.2 |
| C12 | 1.0 | 9.0 |
| C13 | 5.2 | 10.3 |
| C14 | 2.4 | 5.4 |
| L1 | 3.8 | 8.9 |
| L2 | 0.97 | 8.4 |

All Values Are Average Of triplicate Analyses With A S.D. Of ± 0.5.

EXAMPLE 3

The above consortia were exhibiting TDS reduction after 5-days. In order to achieve reduction in lesser time, it was thought that fresh bacterial isolation from a suitable site was required to be carried out and the isolated bacteria screened for their TDS reducing capabilities.

The bacterial isolate in the present invention was isolated from a ten-year old site where saw dust continually accumulated over the period.

5 gm of fresh soil from the above said site was inoculated in the enrichment medium. Enrichment medium was prepared by adding 75 ml of soil extract to 150 ml of Nutrient Broth. To this, 5 ml each of 0.1% (v/v) of lignin and cellulose were added along with 100 µl of Candid B, autoclaved at 15 lbs for 20 minutes at 121° C. The above medium was kept at 120 rpm for 48 hours at 30° C.

Soil Extract was prepared from the soil collected from the above site. 1 kg of the soil was dried at 50° C. for 2 hrs. 400 gm of the dried soil was autoclaved with 960 ml single distilled water for 1 hr at 15 lbs. After autoclaving, the sample was centrifuged at 5000 rpm for 10 minutes at 5° C. The supernatant (extract) was collected and stored in sterile containers for preparation of medium for isolation.

The enriched soil samples are serially diluted in $Na_2HPO_4$—$NaH_2PO_4$ buffer (pH 6.8, 0.05 M). 100 µl from each respective dilution was spread plated in duplicates on media plates with soil extract, 0.3% lignin, 100 µl of Candid B and 2% agar. The plates thus obtained were incubated at 30±2° C. for 16–24 hrs in an inverted position.

The single isolated colony was picked and streaked on a fresh plate containing the same medium. The above step was repeated till pure colonies are obtained.

Bacteria were selected on the basis of morphological differences and gram character. Different consortia were randomly formulated and screened for their TDS reducing capability. The treatability assay was conducted in a 1:1 effluent:biomass ratio and analysed over a period of 48 hours. Three consortia were found to be giving TDS reduction between 6–8% after 48 hours.

TABLE 3

Percentage TDS reduction by consortia formulated from soil bacteria over a period of 48 hours

| CONSORTIA | PERCENTAGE REDUCTION IN TDS | |
|---|---|---|
| | 24 HRS | 48 HRS |
| C1 | 2.9 | 5.3 |
| C2 | 0.0 | 5.3 |
| C3 | 5.1 | 8.4 |
| C4 | 4.4 | 6.2 |
| C5 | 1.3 | 6.6 |
| C7 | 1.3 | 2.2 |

EXAMPLE 4

The individual bacteria comprising of the three best consortia were screened individually for their TDS reducing ability.

The pellets of the above bacteria were prepared as described in example I and used for treatability. The treatability assay was set exactly in the same manner as in example IV and analysed as described in example II. Out of all the individual bacteria, it was found that bacterial isolate number B11 (strain of the instant Application having accession no. MTCC 5098) was giving a percentage reduction of up to 10.1 after 24 hours and 12.2 after a period of 48 hours.

TABLE 4

Percentage TDS reduction by individual soil bacteria after 48 hours

| BACTERIA | PERCENTAGE REDUCTION IN TDS | |
|---|---|---|
| | 24 HRS | 48 HRS |
| B1 | 4.9 | 7.96 |
| B2 | 9.3 | 9.5 |
| B3 | 3.8 | 9.4 |
| B4 | 0.5 | 6.4 |
| B5 | 4.4 | 4.4 |
| B6 | 6.7 | 9.1 |
| B7 | 2.3 | 6.2 |
| B8 | 4.2 | 6.4 |
| B9 | 2.8 | 4.6 |
| B10 | 6.1 | 6.4 |
| B11 (MTCC 5098) | 10.1 | 12.2 |
| B12 | 2.6 | 4.6 |
| B13 | 5.1 | 5.1 |
| B14 | 2.0 | 6.2 |
| B15 | 3.1 | 3.1 |

EXAMPLE 5

Percentage reduction in TDS using different biomass loadings was monitored. Effluent:biomass ratios of 1:0.25, 1:0.50, 1:0.75 and 1:1 were used for studying TDS reduction from pulp mill effluents.

Isolate B11 (Accession No. 5098) was prepared as described in example IV in different aliquots as required for attaining different effluent:biomass loadings. Treatability assays were in the manner as described in example I.

Samples were analysed for reduction in TDS levels as per the modified described in example II. It was found that an effluent: biomass loading of 1:1 was giving the best results among all the tested ratios.

TABLE 5

Percentage reduction in TDS using different biomass loadings of isolate B11

| ISOLATE B11 (Accession No. 5098) | 48 HOURS |
|---|---|
| 1:0.25 | 4.2 |
| 1:0.50 | 4.7 |
| 1:0.75 | 7.1 |
| 1:1 | 11.9 |

Advantages of the Present Invention

1. The isolated bacterium is capable of reducing the TDS levels of the pulp mill effluents in a reproducible manner.
2. The naturally isolated bacterium is non-pathogenic and can be cultured on simple nutrient media without any economic burden.
3. This kind of bacterial reduction of TDS reduction from pulp mill effluents is novel.

What is claimed is:

1. A bacterial strain of accession number MTCC 5098 useful for reducing the Total dissolved solids (TDS) levels from pulp and paper waste water effluents.

2. A method of reducing Total dissolved solids (TDS) from pulp and paper waste water effluents using the strain of claim 1, said method comprises steps of:
   a) inoculating the effluent with the strain to obtain cell slurry,
   b) incubating the cell slurry at about 37° C. at 100 rpm,
   c) estimating TDS levels using the modified TDS method.

3. A method as claimed in claim 2, wherein said method exhibits a TDS reduction of range 4.0 to 12.2 in about 48 hours.

4. A method as claimed in claim 2, wherein the ratio of effluent to biomass is ranging between 1:20 to 1:1.

5. A method as claimed in claim 2, wherein said method exhibits a TDS reduction of about 10.1% in about 24 hours.

6. A method as claimed in claim 2, wherein said method with effluent biomass ratio of about 1:1 exhibits a TDS reduction of about 12.2% in about 48 hours.

7. A method as claimed in claim 5, wherein the ratio of effluent to biomass is 1:1.

8. A process for the preparation of inoculum of the strain of claim 1, said process comprising steps of:
   a) isolating a bacterial isolate,
   b) culturing the bacterial isolate on medium containing soil extract prepared from soil sample and lignin of concentration about 0.3% to get pure cultures,
   c) inoculating the pure culture in nutrient broth containing Tween 80 of concentration about 0.01% to obtain starter culture,
   d) inoculating starter culture into aliquot of nutrient broth to obtain medium,
   e) incubating the medium at about 37° C. for about 100 rpm for time duration ranging between 16–18 hours to obtain a culture of optical density of 1.0, f) centrifuging the culture of step (e) after attaining an to obtain pellet, g) washing the pellet twice by dissolving in $PO_4^{-3}$ buffer of concentration about 0.05M of pH 6.8, h) recentrifuging the washed-pellet at temperature of about 4° C. to obtain pellets, i) washing recentrifuged pellets of step (h) by dissolving in minimum volume of effluent, j) recentrifuging washed pellets of step (i) to obtain cell pellets, and k) homogenizing the cell pellet in minimum volume of effluents to obtain cell slurry for TDS reduction.

9. A process as claimed in claim 8, wherein nutrient broth comprising 5.0 g of sodium chloride, 1.5 g of betel extract, 1.5 g of yeast extract, and 0.2 ml of tween-80.

10. A process as claimed in claim 8, wherein centrifuging at about 6000 rpm for time duration of about 20 minutes at 4° C.

* * * * *